Feb. 3, 1959
H. B. ROBERTS
2,872,166
PORTABLE CHICKEN AND ANIMAL FEED
MIXING AND DISPENSING MEANS
Filed Oct. 10, 1956
2 Sheets-Sheet 1
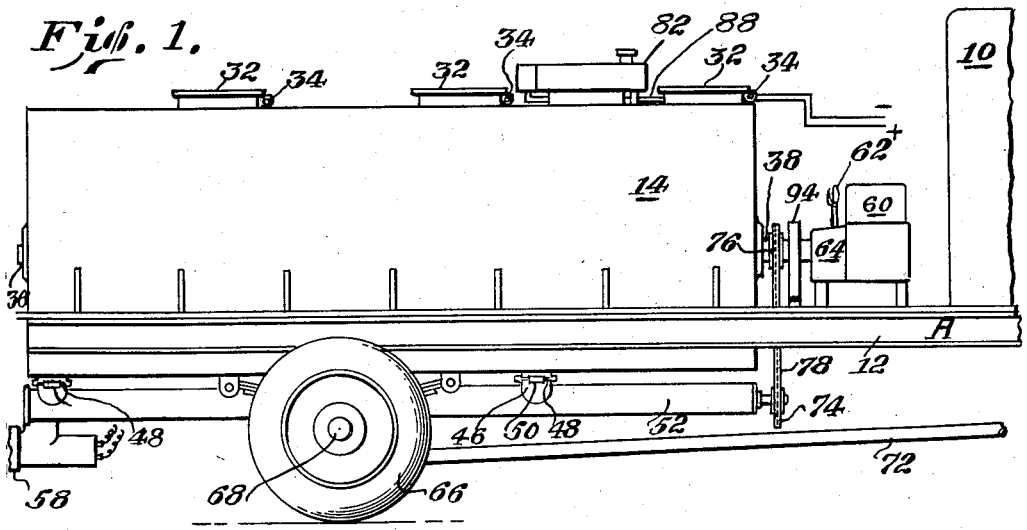
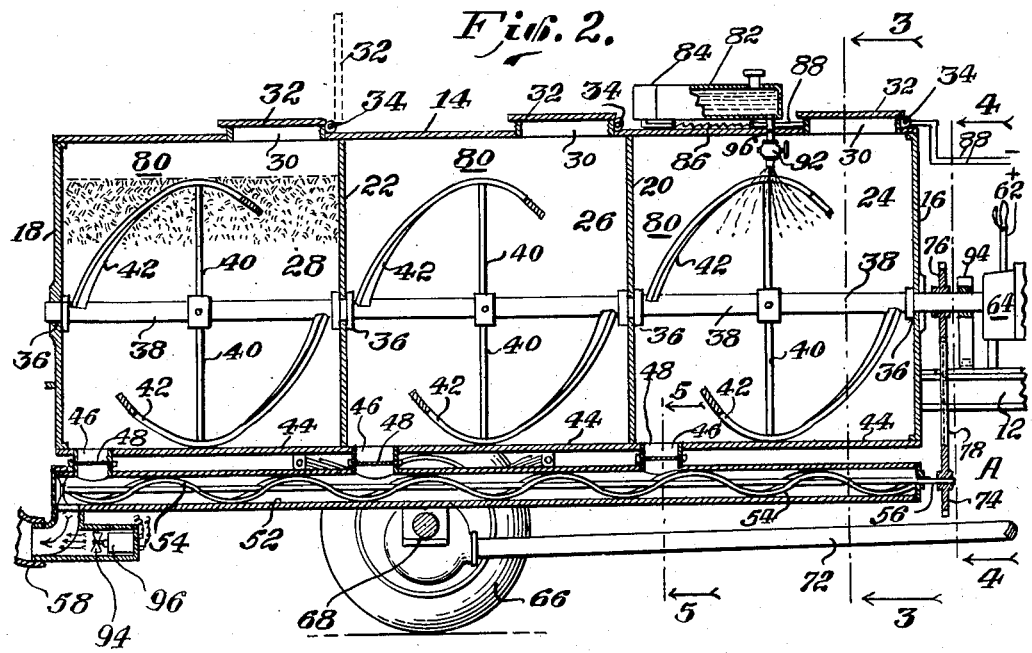
INVENTOR.
Henry B. Roberts.
BY
Mason & Mason
Attorneys.

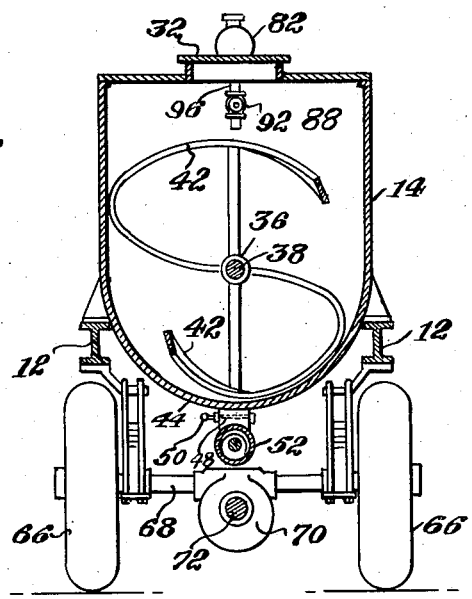
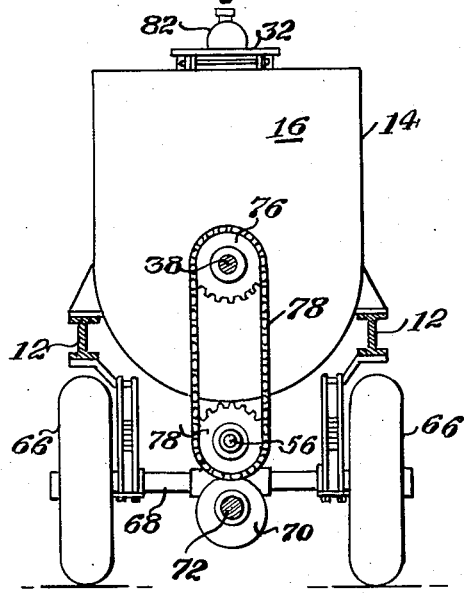
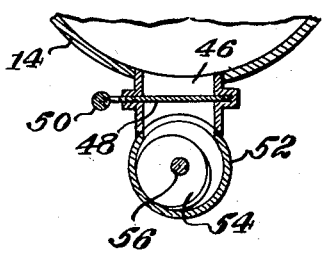

2,872,166

PORTABLE CHICKEN AND ANIMAL FEED MIXING AND DISPENSING MEANS

Henry B. Roberts, Salisbury, Md., assignor to Roberts Industries, Salisbury, Md., a partnership Application October 10, 1956, Serial No. 615,186

5 Claims. (Cl. 259—9)

This invention relates to a mechanism for dispensing and mixing chicken and animal feed. As the machine proceeds over the road from one location to another the feed can be continuously mixed, and dispensed at the separate farms.

An object of the invention therefore is to provide a portable tank-type of truck having a plurality of bins, and means for dispensing the various mixes in said bins at the specific places of destination.

Another object of the invention is to provide a mechanism including a tank having a plurality of partitions therein, and means for simultaneously mixing the feed in each of the tanks.

A further object is to provide power driven means for mixing feed in the aforesaid partitioned bins, whereby the mixer may be moved in one direction, and its direction reversed so that it will then mix the feed in the opposite direction.

Yet another object is to provide readily accessible transportable chicken feed mixing apparatus having means for mixing the feed in transit, and separate means for forcing the feed from one or more bins toward an outlet.

A further important object is to provide a means of dispensing freshly mixed high vitamin content poultry and animal feeds direct to farms.

An additional object is to provide in connection with the structure set forth in the next preceding object means for mixing the feeds from a plurality of said bins during the exit of the material from said bins.

Other objects will appear hereinafter throughout the specification.

In the drawings:

Figure 1 is a side elevation of a truck equipped with the device of this invention;

Figure 2 is a longitudinally vertical medial section, with parts shown in full lines of the structure shown in Figure 1;

Figure 3 is a transverse vertical section taken on the lines 3—3 of Figure 2;

Figure 4 is a vertical section taken on the line 4—4 of Figure 2; and,

Figure 5 is a vertical section taken on the line 5—5 of Figure 2.

The raising of large numbers of chickens and turkeys, other fowls and animals on farms has reached the point where many labor saving devices have been utilized to save both time and labor, and also to provide the necessary amount of housing, feeding, and other equipment so as to raise large numbers of such fowls and animals at minimum cost. Certain types of fowl and animals require different mixtures of feeds. The present invention is directed to a mechanism and method for furnishing various types of feeds in large quantities to farmers. The structure is mobile and is adapted to readily be driven from one farm to the other and furnish any one of several feed mixes, or a combination of these feed mixes, in accordance with the demands of the trade as determined by the types and grades of fowls being raised. It will also be appreciated that the structure hereinafter specifically described, and claimed, is a device for furnishing feed mixes to farm animals as well.

Referring to the drawings, a truck is indicated by the letter A, and this may be the type of truck shown or any other suitable type of truck. As shown in Figure 1, the truck cab is indicated at 10, and it will be further understood that the truck is powered by a suitable motor usually located forward of the cab, not shown.

Extending longitudinally of the truck is a pair of I beams 12 for mounting the tank or body 14. As will be seen by reference to Figure 2 for instance, the tank is provided with a front end 16 and a rear end 18. Spaced from and parallel to these ends are transverse partitions 20 and 22 forming in the structure shown compartments 24, 26 and 28. Each compartment is provided with an opening 30 and a cover 32 which is pivoted at 34, hingedly connecting each cover to the body of the tank. These openings are of such size that a man may descend through any one of them into one of the compartments for the purpose of cleaning the same, or repairing the moving parts therein, described hereinafter.

The ends 16 and 18 and partitions 20 and 22 are provided with bearings 36 for the reception of a rotary shaft 38. Mounted on the shaft are a plurality of arms 40 in each compartment, and these arms support a primary screw or worm section 42. The shape of the tank is such as compared with the height and width of the worm that the worm scrapes against the bottom or floor 44 of the tank. These individual worms therefore, when rotated in one direction, move and mix the material from a space adjacent the forward end of the compartment to the rear end of the compartment, and when rotated in the opposite direction, the material is of course fed in the opposite direction. This latter operation is resorted to in order to mix more thoroughly the several ingredients of which the mixture is comprised.

Located adjacent the rear of each compartment and in the bottom thereof is an outlet aperture 46. This opening can be closed by a valve, shown in Figure 5 as a slide valve 48 having a handle 50 for operating the same.

When the valve is opened, and assuming the material is being moved by the worm toward the opening 46 of each compartment, the material falls through the opening into the passageway 52 located preferably medially beneath the tank 14. As seen particularly in Figure 2, the passageway 52 extends from one end to the other of the tank, and the interior cylindrical sides thereof are engaged by the rotating secondary worm 54 having a shaft 56. The exit or rear end of the passageway is provided with a conduit 58 which may be a flexible boot, or a hose-like conduit that may be swung so as to deliver the contents of the passageway 52 into a tank or bin forming part of the barn of one of the farmer users of the mixed feed.

The shaft 38 which mounts the primer worms is preferably driven by an internal combustion engine 60, said engine having control means 62 and including a combined clutch and reverse driving mechanism indicated in Figures 1 and 2 by the numeral 64.

As shown in Figure 2, a fan 94 is driven by a motor 96 for forcing the contents through conduit 58.

The truck is provided with the usual rear wheels 66, axle 68, differential mechanism 70, and drive shaft 72. This drive shaft is connected to be driven from the truck of the engine.

The secondary worm shaft 56 is provided with a driven sprocket wheel 74 which is rigidly fixed thereto, that is, driven by means of the driving sprocket 76 which latter is splined to the shaft 38. The two sprockets are drivingly connected to each other by a chain 78. It will be appreciated that the primary worm 42 and the secondary worm 54 are both driven by the transmission 64 and the control means 62 thereof, or the rotation of these worms may be reversed so as to more thoroughly stir the feeds in the several bins 24, 26 and 28.

It will be noted that a space 80 has been provided above the primary worms 42. This is for the purpose of accommodating the fluffing of the materials as they are agitated within the bins.

The separate mixing compartments 24, 26 and 28 each contain a plurality of different materials such as in the case of chicken feed mix, fresh fish meal, cod liver oil, animal fat and other feed materials, and the purpose of providing separate compartments is to provide for the simultaneous mixing of different feeds in each compartment or different proportions of the same feeds in the several compartments.

In our discussions with the poultry agents, they pointed out that freshly mixed feed is more palatable, therefore, more desirable than feeds that have been mixed for a period of time, and the older the mixture, the less beneficial is the feed as its vitamin content loses its strength.

A typical mix for poultry is as follows:

| | | |
|---|---|---|
| Ground yellow corn | pounds per ton | 1073 |
| Animal fat, stabilized [1] | do | 80 |
| Menhaden fish meal, 60% protein | do | 125 |
| Poultry by-products meal, 56% prot. | do | 150 |
| Soybean meal, hulled, 50% | do | 350 |
| Corn gluten meal | do | 100 |
| Dhy. alfalfa meal, 17% protein (100,000 I. U. Vit. A/lb.) | pounds per ton | 30 |
| Distillers' solubles (corn) | do | 30 |
| Butyl fermentation sol. (By-100) | do | 20 |
| Limestone | do | 22 |
| Di-calcium phosphate | do | 10 |
| Salt, iodized | do | 6 |
| Trace mineral mix [2] | do | 2 |
| DL-methionine | do | 0.5 |
| Choline chloride [3] | do | 0.5 |
| Toluene II | do | .25 |
| Nicarbazin | do | .25 |
| Arsanilic acid, gms. | amount per ton | 90 |
| Riboflavin, gms.[3] | do | 3 |
| Calcium pantothenate, gms.[3] | do | 5 |
| Niacin, gms.[3] | do | 25 |
| Vitamin A (million I. U.) [3] | do | 4 |
| Vitamin D$_3$ (million I. C. U.) [3] | do | 8 |
| Vitamin B$_{12}$, mgms.[3] | do | 3 |
| Procaine penicillin, gms.[3] | do | 25 |
| Streptomycin, gms.[3] | do | 75 |
| Menadione sodium bisulfate, gms. | do | 1 |
| Totals, lbs. | | 2000 |

[1] Containing antioxidant (butylated hydroxyanisole).
[2] Trace mineral mix containing 6.0% manganese, 0.12% iodine, 2.0% iron, 0.2% copper, .006% zinc, 0.02% cobalt, and 27.0% calcium.
[3] Supplied by premix containing a portion of the corn as a carrier.

(All ingredients from DL-methionine through and including Menadione sodium bisulfate are supplied in a pre-mixed package.)

The animal fat may be retained in a supplementary tank 82 having a thermostat 84 for controlling the temperature of the contents thereof, and a heater 86. Both the thermostat and heater may be supplied by current from the battery (not shown) of the truck through wiring 88, as shown in Figure 2. The supplementary tank 82 is provided with an outlet pipe 90 having a valve 92 for controlling the amount of melted animal fat, for instance, that is led into the compartment 24. The manhole cover 32 is lifted for operation of the valve 92. The numeral 94 indicates a main bearing for shaft 72.

It will be understood that a supplementary tank 82, with its heater, thermostat and outlet, may be provided for each of the compartments 26 and 28, not shown, or a single supplementary tank with heater, thermostat, outlet and inlet may readily be substituted for that shown, with an outlet means that is led into each of the compartments.

This applicant is the first to provide a dispensing mechanism and means for providing a fresh mixture of ingredients constituting a chicken feed mix, or a mix for animals which utilizes such ingredients as chicken meal, cod liver oil and animal fat, or similar substances. As now provided, by the time the farmer receives the feeding mix, many of the perishable ingredients have turned sour or rancid, or at least less palatable due to the existence of such beneficial ingredients as fish meal, animal fat, etc.

With applicant's novel apparatus, it is possible to deliver to a number of separated stations, such as farms, a proper mixture of fresh ingredients, in the amount desired, and it is contemplated that regular deliveries of such feed mixes be distributed in much the same manner that milk is delivered to a plurality of customers. In this manner, it is possible to provide a steady supply of fresh non-rancid feed mixes of materials which would readily become sour or rancid if not dispensed in the manner prescribed herein.

Additionally, it is possible to provide in the same truck a plurality of different mixes so that the farmer may purchase any one of these mixes he desires, some of which are more expensive than others. Also, I will say the forward compartment may contain a larger proportion of animal fat than the fish meal in the rearmost compartment. These mixes may again be mixed by opening the foremost valve 48 and the rearmost valve 48 to the compartments 24 and 28 so as to mix the contents of these two compartments by the worm 54 as will be readily appreciated. It is contemplated that any number of compartments may be provided so that, if desired, the purchaser may obtain a certain proportion of one or more of the contents of each of the compartments, each containing a separate mix.

It will be understood that this invention includes a construction, not shown, where the applicant may use an off-shaft drive from shaft 72 with a suitable clutch and transmission reversing mechanism interposed between the said shaft 72 which forms the drive shaft and the shaft 38 that forms the driven shaft for driving the primary agitators and the secondary agitator.

The above description and drawings disclose a single embodiment of the invention, and specific language has been employed in describing the several features. It will, nevertheless, be understood that no limitations of the scope of the invention are thereby contemplated, and that various alterations and modifications may be made such as would occur to one skilled in the art to which the invention relates.

I claim:

1. In combination, a portable dry feed mixing mechanism comprising a tank having separated compartments, an inlet and an outlet for each compartment adjacent one end thereof, a rotary shaft extending through the several compartments and primary mixing means mounted on said shaft comprising a plurality of arms extending from said shaft, said arms supporting a plurality of spaced worm sections, the bottom portion of said tank being rounded in cross section, each of said worm sections being constructed and adapted to scrape material along said rounded bottom portion of its compartment towards the end of the compartment having the outlet whilst mixing the material adjacent the upper portion of its compartment, each worm section extending longitudinally from one end to the other of its compartment and also extending vertically from the rounded bottom of the compartment to a point adjacent the compartment inlet, a passageway located beneath said compartments, secondary mixing means in said passageway, said outlet of each compartment communicating with the passageway, valve means located in each of said outlets, said mixing means serving to convey material adjacent one end to the opposite end of said passageway deposited through said outlets, said passageway having an outlet end, a conduit operatively connected thereto, a motor and fan located adjacent said passageway outlet end, said fan being in communication with said outlet end and conduit, whereby said fan may blow said dry feed as it passes said outlet end through said conduit.

2. In combination, a portable dry feed mixing mechanism comprising a tank having separated compartments, an inlet and an outlet for each compartment adjacent one end thereby, a rotary shaft extending through the several compartments and primary mixing means mounted on said shaft comprising a plurality of arms extending from said shaft, said arms supporting a plurality of spaced worm sections, the bottom portion of said tank being rounded in cross section, each of said worm sections being constructed and adapted to scrape material along said rounded bottom portion of its compartment towards the end of the compartment having the outlet whilst mixing the material adjacent the upper portion of its compartment, each worm section extending longitudinally from one end to the other of its compartment and also extending vertically from the rounded bottom of the compartment to a point adjacent the compartment inlet, a passageway located beneath said compartments, secondary mixing means in said passageway, said outlet of each compartment communicating with the passageway, valve means located in each of said outlets, said mixing means serving to convey material adjacent one end to the opposite end of said passageway deposited through said outlets, each compartment having a fluffing space located above said primary mixing means, said passageway having an outlet end, a conduit operatively connected thereto, a motor and fan located adjacent said passageway outlet end, said fan being in communication with said outlet end and conduit, whereby said fan may blow said dry feed as it passes said outlet end through said conduit.

3. In combination, a portable dry feed mixing mechanism comprising a tank having separated compartments, an inlet and an outlet for each compartment adjacent one end thereof, a rotary shaft extending through the several compartments and primary mixing means mounted on said shaft comprising a plurality of arms extending from said shaft, said arms supporting a plurality of spaced worm sections, the bottom portion of said tank being rounded in cross section, each of said worm sections being constructed and adapted to scrape material along said rounded bottom portion of its compartment towards the end of the compartment having the outlet whilst mixing the material adjacent the upper portion of its compartment, each worm section extending longitudinally from one end to the other of its compartment and also extending vertically from the rounded bottom of the compartment to a point adjacent the compartment inlet, a passageway located beneath said compartments, secondary mixing means in said passageway, said outlet of each compartment communicating with the passageway, valve means located in each of said outlets, said mixing means serving to convey material adjacent one end to the opposite end of said passageway deposited through said outlets, and power means for rotating said shaft and the primary mixing means mounted thereon and said secondary mixing means, said power means for rotating said shaft including transmission means providing reversing means for reversing the rotation of said shaft, said passageway having an outlet end, a conduit operatively connected thereto, a motor and fan located adjacent said passageway outlet end, said fan being in communication with said outlet end and conduit, whereby said fan may blow said dry feed as it passes said outlet end through said conduit.

4. In combination, a portable dry feed mixing mechanism comprising a tank having separated compartments, an inlet and an outlet for each compartment adjacent one end thereof, a rotary shaft extending through the several compartments and primary mixing means mounted on said shaft comprising a plurality of arms extending from said shaft, said arms supporting a plurality of spaced worm sections, the bottom portion of said tank being rounded in cross section, each of said worm sections being constructed and adapted to scrape material along said rounded bottom portion of its compartment towards the end of the compartment having the outlet whilst mixing the material adjacent the upper portion of its compartment, each worm section extending longitudinally from one end to the other of its compartment and also extending vertically from the rounded bottom of the compartment to a point adjacent the compartment inlet, a passageway located beneath said compartments, secondary mixing means in said passageway, said outlet of each compartment communicating with the passageway, valve means located in each of said outlets, said mixing means serving to convey material adjacent one end to the opposite end of said passageway deposited through said outlets, each compartment having a fluffing space located above said primary mixing means, and power means for rotating said shaft and the primary mixing means mounted thereon and said secondary mixing means, said power means for rotating said shaft including transmission means provided with clutch means and reversing means for reversing the rotation of said shaft, said passageway having an outlet end, a conduit operatively connected thereto, a motor and fan located adjacent said passageway outlet end, said fan being in communication with said outlet end and conduit, whereby said fan may blow said dry feed as it passes said outlet end through said conduit.

5. In combination, a portable dry feed mixing mechanism comprising a tank having separated compartments, an inlet and an outlet for each compartment adjacent one end thereof, a rotary shaft extending through the several compartments and primary mixing means mounted on said shaft comprising a plurality of arms extending from said shaft, said arms supporting a plurality of spaced worm sections, the bottom portion of said tank being rounded in cross section, each of said worm sections being constructed and adapted to scrape material along said rounded bottom portion of its compartment towards the end of the compartment having the outlet whilst mixing the material adjacent the upper portion of its compartment, each worm section extending longitudinally from one end to the other of its compartment and also extending vertically from the rounded bottom of the compartment to a point adjacent the compartment inlet, a passageway located beneath said compartments, secondary mixing means in said passageway, said outlet of each compartment communicating with the passageway, valve means located in each of said outlets, said mixing means serving to convey material adjacent one end to the opposite end of said passageway deposited through said outlets, and a supplementary tank, heating means for said tank, thermostatic means for controlling said heating means, and means operatively connecting the interior of said supplementary tank with at least one of said compartments, said passageway having an outlet end comprising an opening in the lower end thereof, a flexible conduit connected adjacent to and below said outlet end whereby dry feed may fall by gravity adjacent said conduit, a motor and fan located below said passageway, said fan being in communication with said conduit whereby said dry feed may be blown through said conduit by said fan after the same has passed through said passageway opening.

References Cited in the file of this patent

UNITED STATES PATENTS

| | | |
|---|---|---|
| 811,482 | Case | Jan. 30, 1906 |
| 2,081,552 | Myers | May 25, 1937 |
| 2,447,202 | Nowery | Aug. 17, 1948 |
| 2,501,944 | Jaeger et al. | Mar. 28, 1950 |
| 2,719,030 | Pearson | Sept. 27, 1955 |

FOREIGN PATENTS

| | | |
|---|---|---|
| 501,685 | Canada | Apr. 20, 1954 |